E. DEDERICK.
ROLLER BEARING.
APPLICATION FILED APR. 27, 1908.
1,029,797.
Patented June 18, 1912.
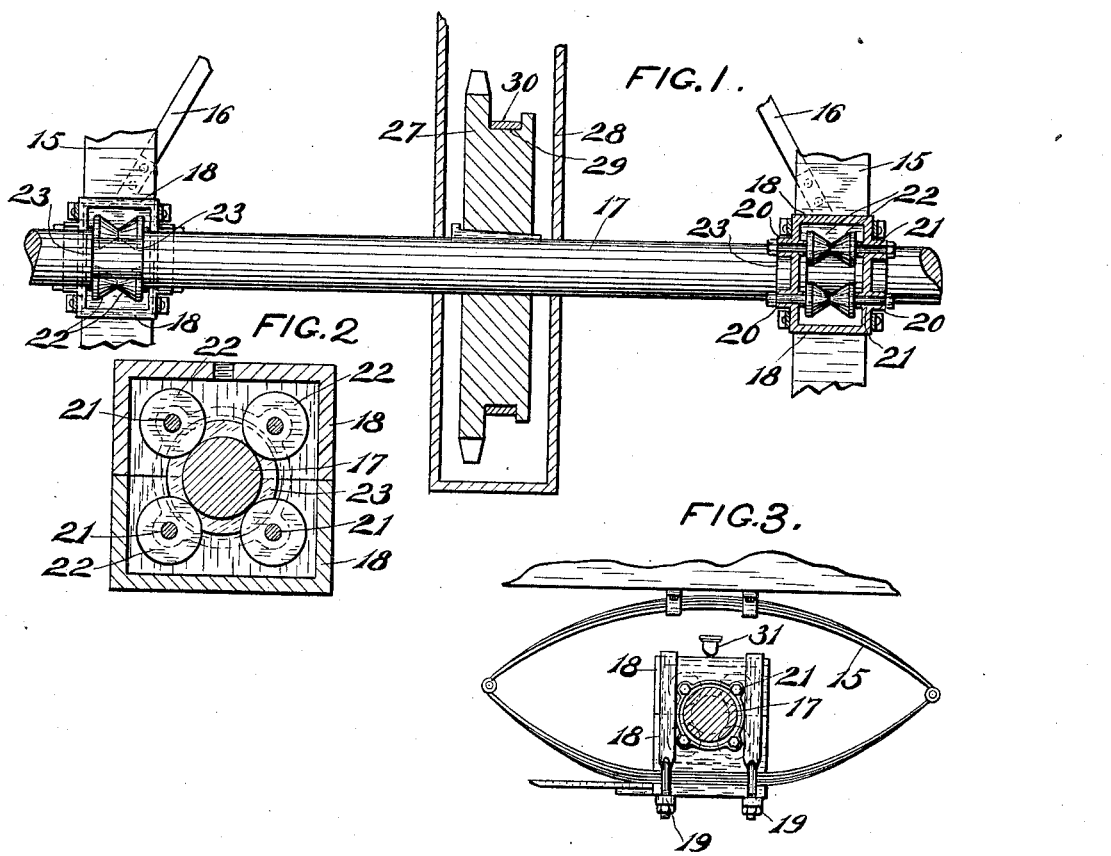
WITNESSES.
INVENTOR.
Ezra Dederick,
By Benedict, Morsell & Caldwell,
ATTORNEYS.

UNITED STATES PATENT OFFICE.

EZRA DEDERICK, OF WISCONSIN VETERANS HOME, WISCONSIN.

ROLLER-BEARING.

1,029,797. Specification of Letters Patent. Patented June 18, 1912.

Application filed April 27, 1908. Serial No. 429,312.

*To all whom it may concern:*

Be it known that I, EZRA DEDERICK, residing in Wisconsin Veterans Home, in the county of Waupaca and State of Wisconsin, have invented new and useful Improvements in Roller-Bearings, of which the following is a description, reference being had to the accompanying drawings, which are a part of this specification.

This invention has for its object to provide a bearing for automobile driving shafts for use in automobiles of the buggy type in which the rear or driving wheels are mounted on a turning shaft which is journaled on the springs of the body portion.

An object of the invention is to provide such a machine with a shaft and bearing construction, which while permitting practically frictionless turning of the driving shaft prevents end thrust thereof and securely protects the bearing parts from dust.

With the above and other objects in view the invention consists in the bearing as herein claimed and all equivalents.

Referring to the accompanying drawings in which like characters of reference indicate the same parts in the different views: Figure 1 is a sectional plan view of the driving shaft and its bearings constructed in accordance with this invention; Fig. 2 is a sectional view of one of the shaft bearings; and, Fig. 3 is a sectional elevation of one of the shaft bearings and the part to which it is secured.

In these drawings 15 represents the rear springs of an automobile to support the rear end of the body thereof, said springs being connected at their lower parts by reach bars 16 with the fifth wheel of the vehicle.

The ordinary fixed rear axle of a buggy is replaced by a turning shaft 17, which is journaled in roller bearings connected to the lower parts of the springs 15, such bearings being formed by casing sections 18 clamped together upon the lower parts of the springs 15 and to the reach bars 16 by means of clips 19 as shown in Fig. 3. Each section 18 of the bearing casing is of an open box like formation and has projecting lugs 20 to which pins 21, preferably bolts, are fastened to form supports for pairs of rollers 22, each pin having two of the rollers thereon and the rollers being of a truncated cone shape and bearing against each other at their smaller ends. The shaft 17 is reduced in diameter for a distance just sufficient to receive the pairs of rollers 22 between its shoulders 23 formed by such reduction, and as the rollers are prevented from longitudinal movement on their pin supports by bearing against bosses on the sides of the bearing casing, the engagement between the large ends of the rollers and the shoulders 23 of the shaft prevents longitudinal movement of the shaft in either direction, thus overcoming the end thrust thereof. The rollers 22, of course, facilitate the freedom with which the shaft 17 may turn, reducing its friction to a minimum and leaving no unnecessary play thereof.

The shaft may be provided with any suitable driving connection such as the sprocket wheel 27 keyed thereon and contained within the casing 28 and forming a brake drum 29 surrounded by a brake strap 30.

In order that the bearings may be properly lubricated the top bearing section 18 has an oil cup 31 threaded therein to drop oil onto the reduced portion of the shaft from which it will be taken up by the rollers and carried to their bearings.

What I claim as my invention and desire to secure by Letters Patent is:

A roller bearing comprising a rotary axle having a reduced portion forming opposite shoulders, a casing surrounding the reduced portion of the axle and having bosses formed thereon, pins extending across the casing and through the bosses, and pairs of conical rollers on the pins with their smaller ends together and with their other ends bearing against the bosses on the sides of the casing and against the shoulders of the axle to prevent longitudinal movement thereof.

In testimony whereof, I affix my signature, in presence of two witnesses.

EZRA DEDERICK.

Witnesses:
R. S. C. CALDWELL,
ANNA F. SCHMIDTBAUER.

Copies of this patent may be obtained for five cents each, by addressing the "Commissioner of Patents, Washington, D. C."